United States Patent [19]

Deangelis et al.

[11] Patent Number: 5,734,797
[45] Date of Patent: Mar. 31, 1998

[54] SYSTEM AND METHOD FOR DETERMINING CLASS DISCRIMINATION FEATURES

[75] Inventors: Christopher M. Deangelis, Cranston, R.I.; Robert W. Green, Harwich, Mass.

[73] Assignee: The United States of America as represented by the Secretary of the Navy, Washington, D.C.

[21] Appl. No.: 702,299

[22] Filed: Aug. 23, 1996

[51] Int. Cl.$^6$ .................... G06E 1/00; G06F 15/18
[52] U.S. Cl. .................... 395/23; 395/21; 395/24
[58] Field of Search .................... 395/20–25, 27; 382/155–161

[56] References Cited

U.S. PATENT DOCUMENTS

| | | | |
|---|---|---|---|
| 5,444,824 | 8/1995 | Austvold et al. | 395/76 |
| 5,546,503 | 8/1996 | Abe et al. | 395/23 |
| 5,636,326 | 6/1997 | Stork et al. | 395/21 |

OTHER PUBLICATIONS

Jain et al. "Learning Texture Discrimination Masks," IEEE Transactions on Pattern Analysis and Machine Intelligence, vol. 18, Issue 2, pp. 195–205, Feb. 29, 1996.

Lursinap "Applied Self-Recovery Technique to Link and Neuron Prunings," Circuits and Systems, 1994 Midwest Symposium, V. 1, pp. 545–548, Dec. 31, 1994.

Luk et al. "Pruning via Number of Links and Neuron Activities," Circuits and Systems, 1993 IEEE International Symposium, pp. 2415–2418, May 31, 1993.

Khorasani et al. "Structure Adaptation in FeedFoward Neural Networks," Neural Networks, 1994 International Conf., vol. 3, pp. 1403–1408, Dec. 31, 1994.

Giles et al. "Pruning Recurrent Neural Networks for Improved Generalization Performance," IEEE Transaction on Neural Networks, vol. 5, Issue 5, pp. 848–851, Sep. 30, 1994.

Primary Examiner—Tariq R. Hafiz
Attorney, Agent, or Firm—Michael J. McGowan; William F. Eipert; Prithvi C. Lall

[57] ABSTRACT

A system for generating a minimal artificial neural network (ANN) architecture having as inputs the minimal number of features necessary to discriminate between event classes. A network generator generates an initial ANN architecture. A training processor generates a trained ANN by training the initial ANN to a desired degree of accuracy. A pruning processor prunes the trained ANN by removing interconnections and nodes from the trained ANN. The training processor and pruning processor continue to train and prune the ANN until a minimal network architecture having the class discrimination features as its only inputs is obtained.

6 Claims, 1 Drawing Sheet

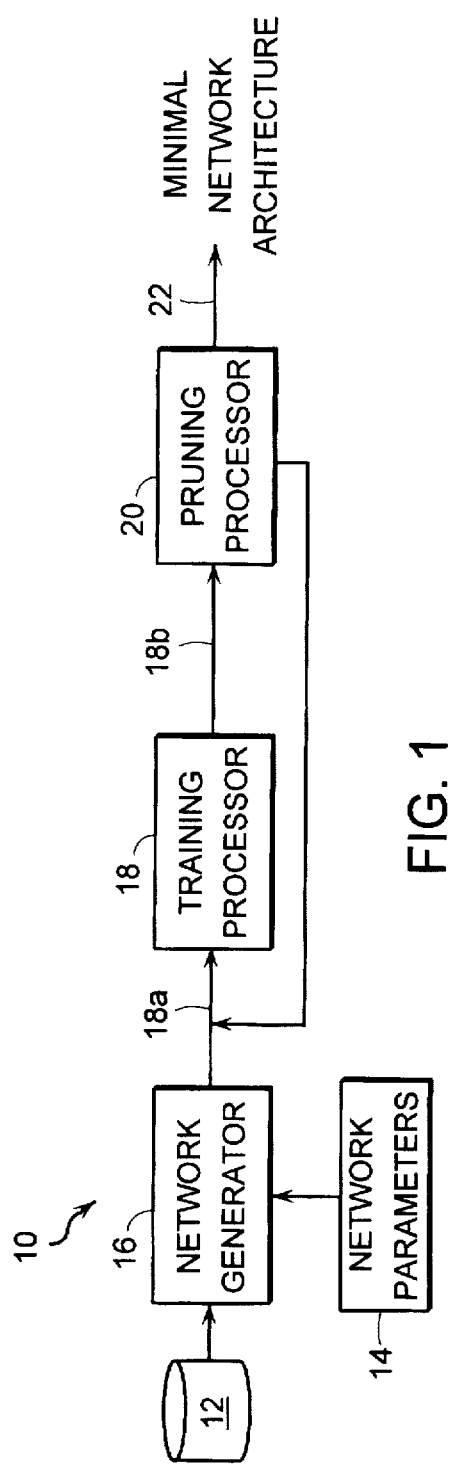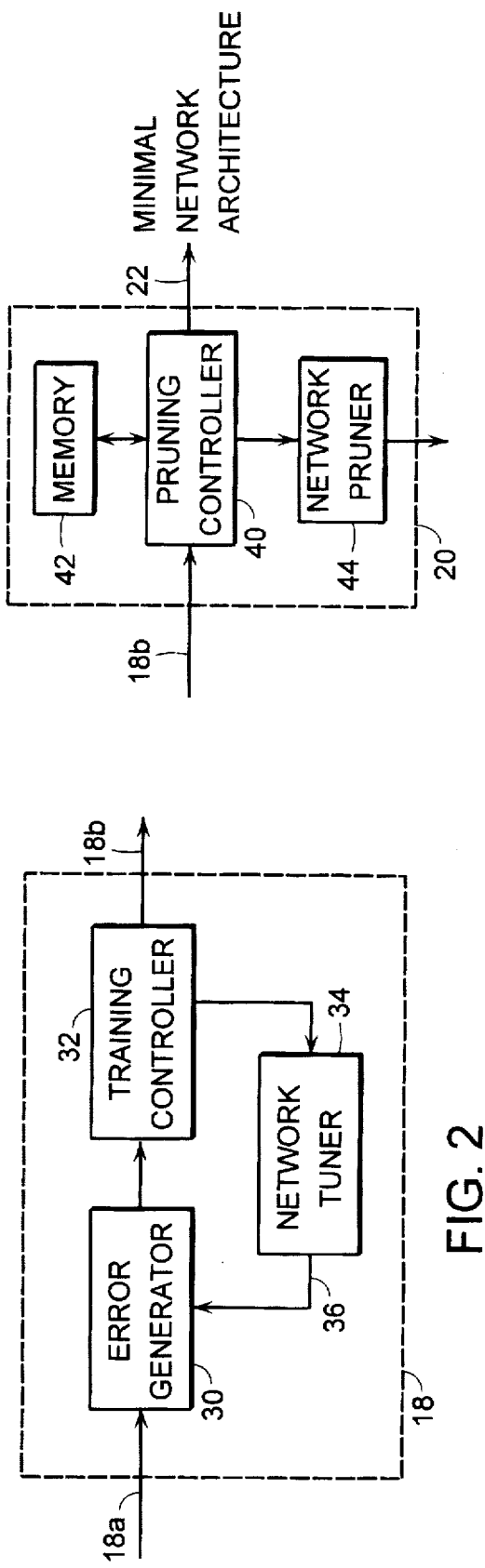

SYSTEM AND METHOD FOR DETERMINING CLASS DISCRIMINATION FEATURES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATION

This patent application is co-pending with a related patent application entitled SYSTEM AND METHOD FOR DETERMINING NODE FUNCTIONALITY IN ARTIFICIAL NEURAL NETWORKS, Navy Case No. 77926, by co-inventor Christopher M. DeAngelis.

BACKGROUND OF THE INVENTION

(1) Field of the Invention

The present invention relates to generating and optimizing artificial neural networks. More particularly, the present invention relates to a system for determining class discrimination features and generating a network architecture for mapping the features to the event classes.

(2) Description of the Prior Art

Artificial neural networks (ANN) typically use an array of values or measurements defining properties of the input pattern called a feature vector. When the different event classes have known, unique measurable characteristics and features, the classification problem is straightforward. However, for many applications the characteristics of the classes and features that separate the classes are unknown and a network designer must determine the features that capture the class differences. Selecting the proper features is necessary to obtain robust classification performance.

Poor feature sets cause a number of difficulties for ANN based classification or recognition systems. The use of too few features results in poor classification accuracy. However, using too many features will also decrease overall classification accuracy. This counter-intuitive "performance peaking" phenomenon is due to the "curse of dimensionality," and affects all classifiers, whether neural network or classical. Thus, identifying and removing features that do not enhance classification performance, plays an important part in feature set design. Superfluous features contribute "opportunities" for misclassification and should be eliminated to improve system performance. Furthermore, a greater number typically requires a larger, more complex ANN. Consequently, from both a performance and economic perspective, it is important to determine the class discrimination features and identify the minimal features necessary to discriminate between event classes.

Although several feature reduction techniques have been developed, they generally suffer from one or more disadvantages which limit their use in many applications. For example, a direct algorithm for obtaining the feature set with the lowest classification error rate is the exhaustive combination method (ECM). ECM examines all possible combinations of features to find the best feature set. However, ECM is computationally complex and impractical for most applications unless the number of possible features is small as the number of possible combinations grows exponentially with the number of features.

Another common method, Fisher's method, derives a new set of features that are linear combinations of the original features. The span of these newly derived features is called the multiclass Fisher projection space (FPS). The FPS maximally separates the class means relative to the class variances. This geometric interpretation greatly facilitates intuition and strongly indicates that the FPS is a good space for feature reduction.

Although Fisher's method is computationally fast, it does not linearly order the individual features in terms of their relative importance to classification. Additionally, the FPS is unlikely to contain any of the original features in its span, and thus, features that have natural interpretations (e.g., frequency, time, or magnitude) may not be readily interpreted if they have been modified.

In addition, common methods of determining class discrimination features such as ECM and Fisher's method do not provide a minimal network architecture with which the features can be used. A Minimal network reduces system complexity, provides faster classification and may allow representation of the ANN with traditional circuits such as TTL circuitry or filters. Thus, what is needed is a system for determining class discrimination features and generating a network architecture for mapping the features to the event classes.

SUMMARY OF THE INVENTION

Accordingly, it is a general purpose and object of the present invention to provide a system for reducing the size of an artificial neural network.

Another object of the present invention is the provision of a system for determining class discrimination features.

A further object of the present invention is to provide a system for determining the minimal features necessary to discriminate between event classes and for generating an artificial neural network architecture having the fewest number of nodes, weights, and biases that provides classification to a desired degree of accuracy.

These and other objects made apparent hereinafter are accomplished with the present invention by providing a system for generating a network architecture which maps the class discrimination features to the event classes. The system includes a network generator for generating an initial ANN architecture, a training processor for generating a trained ANN, and a pruning processor for pruning a trained ANN to generate a pruned ANN. The training processor trains the initial architecture to a desired classification accuracy and outputs a trained ANN. The pruning processor prunes the trained ANN to remove nodes and interconnections from trained ANN that are not required for classification and passes the pruned ANN to the training processor. The training and pruning proessors alternate the training and pruning processing until the training processor is unable to train the ANN to the desired classification accuracy. The pruning processor then outputs the last ANN which was trained to the desired level of accuracy as the network architecture for mapping the class discrimination features to the event classes.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 1 shows a system for identifying class discrimination features and generating a minimal network architecture for mapping the features to the event classes;

FIG. 2 is a block diagram of a training processor for a system for determining class discrimination features and generating a minimal network architecture; and FIG. 3 is a block diagram illustrating a pruning processor of a system for determining class discrimination features and generating a minimal network.

DESCRIPTION OF THE PREFERRED EMBODIMENT

The present invention relates to a system for operating on a repository of samples and/or features to identify a feature set having the minimum number of features necessary to discriminate between event classes as well as a minimal neural network architecture for mapping the feature set to the event classes associated with the repository. Although the present invention is applicable to any artificial neural network based pattern recognition or data classification system, in describing the system and method of the present invention, reference will be made to an artificial neural network based system for classifying an input signal as being either a female voice or a male voice.

Referring now to FIG. 1, there is shown a system 10 for determining class discrimination features and generating a network architecture for mapping the class discrimination features to the event classes in accordance with the present invention. Inputs to system 10 include repository 12 of samples/features which can be used for input to an artificial neural network (ANN) configured for a specific application, such as pattern recognition or data classification, and user defined network parameters 14.

Repository 12 comprises a plurality of samples and/or features used as inputs for training and/or testing an ANN. The samples/features of repository 12 can be any information desired for a particular application. However, the samples/features of repository 12 must be pre-associated with an event class; that is, the correct event class for each sample must be known. For a flower classification system, repository 12 may contain several pictures of different type of flowers or a plurality of feature vectors defining properties of the flowers such as color, petal size, petal shape, number of petals, flower shape, size or the like. For a female/male voice recognition application, repository 12 may contain several sound clips of one or more different female voices and several sound clips of one or more different male voices.

User defined network parameters 14 contain information describing a network topology, number of input nodes, number of hidden layers, nodes per hidden layer, initial weights and biases, number of connections between layers or the like necessary to generate a conventional ANN having any topology desired. While the present invention is applicable to any initial network architecture, in describing the system and method of the present invention, reference will be made to a standard, full connected, feedforward backprop network as an initial architecture. Additionally, network parameters 14 may contain information describing the type of input parameters or features to be used by the ANN. For example, to classify acoustic signals, the network parameters may indicate that average power, peak power, frequency components (Fourier transforms) or time/frequency components (wavelet transforms) are to be used as inputs to the ANN. User defined network parameters 14 for a female/ male voice classification system may indicate that the initial network is a standard (fully connected, feedforward) backprop network having as inputs the twenty largest wavelet coefficients for a given sample.

ANN generator 16 uses the contents of repository 12 and/or the user defined network parameters 14 to generate an initial ANN architecture. Generator 16 can build a network having any initial architecture that is consistent with the requirements and/or limitations of repository 12 and network parameters 14. In addition to generating an initial network architecture, generator 16 can collect and compile the data necessary for training the initial network. For a female/male voice classification system, generator 16 may acquire samples for each event class and extract a feature vector from each of the samples by transforming the sample signal into a set of wavelet coefficients via a series of one-dimensional wavelet transforms and saving a number of the largest coefficients. The initial ANN architecture and training data are passed to training processor 18 where the initial ANN is trained.

Training processor 18 receives input ANN 18a from either ANN generator 16 or pruning processor 20 and generates trained ANN 18b. Processor 18 trains the input ANN 18a using supervised training such as reinforcement learning or the like to produce trained ANN 18b.

Processor 18 trains input ANN 18a until the input ANN is "fully trained" or a "timeout" occurs. A fully trained ANN is an ANN that provides the mapping from $R^M$ to $R^N$, where M is the number of inputs and N is the number of event classes, to a desired degree of accuracy. That is, a fully trained ANN is a network which achieves a desired level of classification. A timeout occurs if processor 18 is unable to train input ANN 18a to the desired degree of accuracy within a given threshold such as within a predetermined number of epochs or within a given amount of time, or the like. The trained ANN 18b generated by processor 18 when a timeout occurs will be referred to as a partially trained network.

Pruning processor 20 receives trained ANN 18b from training processor 18. If trained ANN 18b received from processor 18 is a fully trained ANN, pruning processor 20 stores the configuration of the fully trained ANN in memory and generates a pruned ANN by removing nodes and interconnections from trained ANN 18b that are not required for the mapping from $R^M$ to $R^N$. The pruned ANN is then passed back to training processor 18 to be retrained. If processor 20 receives a partially trained ANN from the training processor, pruning processor 20 retrieves the configuration of the last fully trained ANN received from processor 18 from memory and outputs the fully trained ANN as the minimal ANN architecture 22 for the given application.

Minimal ANN architecture 22 generated by system 10 is a subset model of the initial ANN established by generator 16. The minimal architecture 22 describes the configuration, based upon the initial architecture, of an ANN having the fewest number of nodes, weights, and biases that provides the mapping from $R^M$ to $R^N$ to a desired degree of accuracy. The inputs of minimal ANN 22 define the class discrimination features and identify the minimal features necessary to discriminate between event classes.

Referring now to FIG. 2 there is shown a block diagram of an embodiment of training processor 18 for use in the system of FIG. 1. Training processor 18 comprises error generator 30 for generating the network error of a given ANN, training controller 32 for determining whether input ANN 18a is fully trained or a timeout occurred, and network tuner 34 for adjusting the weights and biases of a given ANN based upon the network error.

Error generator 30 receives input ANN 18a from generator 16 or processor 20 (FIG. 1) and generates the network error, $E_N$, for the input ANN. Generator 30 can calculate network error using any conventional method. For the female/male voice classification backprop network, the network error is generated by running the training data through the ANN and summing the square of the error of each output.

Training controller 32 tracks and analyzes the network error, $E_N$, from generator 30 to determine whether to output trained ANN 18b or to adjust weights and biases. Training controller 32 compares $E_N$ generated by generator 30 with a threshold error, $E_T$. If $E_N$ is less than $E_T$, the input ANN 18a has been trained to the desired level of accuracy, and controller 32 outputs a fully trained ANN 18b. If $E_N$ is greater than $E_T$, input ANN 18a has not trained to the desired level of accuracy and controller 32 determines if a timeout has occurred. If a timeout has occurred, controller 32 outputs a partially trained ANN 18b. If a timeout has not occurred, controller 32 directs network tuner 34 to adjust the weights and biases of the input ANN. Preferably, controller 32 monitors $E_N$ calculated by generator 30 over time and signals that a timeout has occurred if the improvement (reduction) in $E_N$ over a fixed number of epochs is less than a threshold reduction.

Network tuner 34 operates to adjust the weights and biases within the input ANN. The weights and biases can be adjusted using any known tuning algorithm for network optimization suitable for the ANN architecture including, but not limited to, stabilized Newton, quasi-Newton or conjugate-gradient algorithms or the like. Preferably, tuner 34 includes a weight and/or bias decay term such as the weight and/or bias times a decay constant, an adaptive decay or the like in the tuning algorithm to encourage weight and/or bias terms to migrate to smaller absolute values. After adjusting the weights and biases, tuner 34 signals error generator 30 to determine network error.

FIG. 3 shows an embodiment of the pruning processor 20 of FIG. 1. Pruning processor 20 comprises pruning controller 40, memory 42 and network pruner 44. Pruning controller 40 receives a trained ANN 18b from processor 18 (FIG. 1). If trained ANN 18b is fully trained, controller 40 stores a copy of the network configuration of the fully trained ANN in memory 42 and passes the trained ANN 18b to network pruner 44. If controller 40 receives a partially trained ANN from training processor 18 (FIG. 1), the pruning controller retrieves the network configuration of last fully trained ANN received from processor 18 (FIG. 1) from memory 42 and outputs the fully trained ANN as the minimal ANN architecture 22 for the given application.

Network pruner 44 operates on the trained ANN 18b received by controller 40 to generate a pruned ANN which is returned to training processor 18 (FIG. 1). Pruner 44 operates on the trained ANN 18b to remove nodes and interconnections that are not needed for classification. Pruner 44 first removes any insignificant connections to nodes. A connection to a node is considered to be insignificant if the weight for the connection is negligible when compared with the weights for all other connections to the same node. A weight may be considered to be negligible if it is one or more orders of magnitude less than the average of all other weights to that node. Pruner 44 may also remove the bias for a node if the bias is negligible (one or more orders of magnitude less) when compared to the sum of W·X over the entire training set where W is the vector of weights for the connections to the node and X is the vector of inputs to the node. Pruner 44 then removes any "dead" nodes. A dead node is defined as a node that has an output activation of approximately zero for all patterns. After removing the dead nodes, pruner 44 removes all the "saturated" nodes. A saturated node is defined as a node having an output activation of approximately one for all input patterns. When removing a saturated node, pruner 44 adds the weighted activation of the removed node to the bias term of any follow node(s) connected to the saturated node. Pruner 44 then removes any "orphan" node from the ANN. An orphan node is a node having no input connections or no output connections. Pruner 44 continues to prune until it can no longer remove any negligible connections or dead, saturated, or orphaned nodes. The resulting pruned ANN is then passed back to the training processor.

The system 10 described herein may be implemented in hardware using standard electronic components to form the circuits for performing the functions in the various functional blocks; however, it is preferred to implement the system using a computer and software which carries out the aforementioned functions. The software may be in any desired language and may use standard mathematical techniques to perform the functions described herein. A software implementation is preferred due to greater degree of flexibility in reconfiguration for various types of inputs and network architectures as well as the limitations of current VLSI circuit densities.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for generating a minimal artificial neural network (ANN) architecture comprising:

a network generator for generating an initial ANN architecture;

a pruning processor having a pruning input for receiving an ANN and generating a selected one of a pruned ANN and said minimal ANN architecture, said pruning processor comprising means for removing weights and biases from ANN nodes, means for removing dead nodes, means for removing saturated nodes, and means for removing orphaned nodes, wherein a dead node is an ANN node having an output activation of approximately zero for every input pattern, a saturated node is an ANN node having an output activation of approximately one for every said input pattern, and an orphan node is an ANN node lacking a selected one of all input connections and all output connections; and a training processor, coupled to said network generator and said pruning processor, for receiving an input ANN, said input ANN being a selected one of said initial ANN architecture and said pruned ANN, and for generating a trained ANN from said input ANN, said trained ANN being coupled to said pruning input.

2. The apparatus of claim 1 wherein said training processor comprises:

means for generating a network error $E_N$ for said input ANN;

a training controller for comparing said network error $E_N$ with a threshold error $E_T$ and for generating a selected one of a trained ANN and a control signal; and a network tuner, coupled to said training controller, for adjusting the weights and biases of said input ANN in response to said control signal received from said training controller.

3. The apparatus of claim 2 wherein said training controller generates a fully trained ANN when said network error $E_N$ is less than said threshold error $E_T$.

4. The apparatus of claim 1 wherein said means for removing weights and biases from ANN nodes removes an input connection to a first ANN node when said input connection has a weight that is more than one order of magnitude less than an average of weights for every other input connection to said first ANN node.

5. A method for generating a minimal artificial neural network (ANN) architecture comprising:

generating an initial ANN architecture;

training an input ANN to generate a trained ANN from said input ANN, said input ANN being a selected one of said initial ANN architecture and a pruned ANN; and pruning said trained ANN to generate a selected one of said pruned ANN and said minimal ANN architecture, said pruning step comprising:

(a) removing weights and biases from ANN nodes, (b) removing a dead node, said dead node being an ANN node having an output activation of approximately zero for every input pattern, (c) removing a saturated node, said saturated node is an ANN node having an output activation of approximately one for every said input pattern, and (d) removing an orphaned node, wherein said orphaned node is an ANN node lacking a selected one of all input connections and all output connections.

6. The method of claim 5 wherein said step of removing weights and biases comprises:

comparing, for each input connection to a selected ANN node, a weight associated with said input connection with an average of weights associated with every other input connection to said selected ANN node; and removing, from said selected ANN node, each input connection having an associated weight that is more than one order of magnitude less than the average of weights associated with every other input connection to said selected ANN node.

* * * * *